Figure 1:
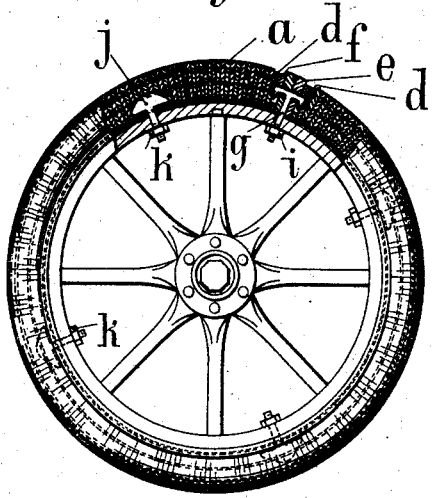

No. 883,398. PATENTED MAR. 31, 1908.
C. C. GOUIN.
FLEXIBLE TIRE FOR VEHICLE WHEELS.
APPLICATION FILED OCT. 2, 1906.

Witnesses:-

Inventor:-
Clement Clodomir Gouin
by Geo. P. Whittlesey
Attorney

THE NORRIS PETERS CO., WASHINGTON, D. C.

UNITED STATES PATENT OFFICE.

CLÉMENT CLODOMIR GOUIN, OF PARIS, FRANCE.

FLEXIBLE TIRE FOR VEHICLE-WHEELS.

No. 883,398.     Specification of Letters Patent.     Patented March 31, 1908.

Application filed October 2, 1906. Serial No. 337,074.

*To all whom it may concern:*

Be it known that I, CLÉMENT CLODOMIR GOUIN, citizen of the French Republic, residing at Paris, in the Department of the Seine, France, have invented certain new and useful Improvements in Flexible Tires for Vehicle-Wheels, of which the following is a specification.

Numerous attempts have already been made to obtain a flexible tire, for vehicle wheels, which would have all desirable qualities, but none of these attempts have been crowned with success. Neither tires of solid rubber nor pneumatic tires give satisfaction; the former are easily cut and are subject to slipping, the latter present, in addition to these disadvantages, that of being liable to bursting. Attempts have been made to remedy these disadvantages by associating leather with the tires, of which more will be said later, by incorporating the leather in the body of the tire, or in using it as a protector; success has been attained in increasing the durability of the tire, but at the same time, flexibility of the tire has been diminished. This diminution of flexibility is due to the fact that in the improved tires mentioned the leather is usually disposed in such a manner that it comes flat on the ground, which is precisely a situation in which the elasticity of the leather is practically *nil*. The leather possesses on the contrary an appreciable elasticity when it is disposed edgewise, and in the application of this property lies the spirit of the invention. This consists, in principle, of furnishing the rim of vehicle wheels with a series of small pieces of leather placed edgewise and side by side; thanks to which a tire presenting great flexibility and not possessing any of the faults mentioned above is obtained, a tire particularly adapted for employment on wheels of heavy weight.

The drawing hereto annexed shows, by way of example, a method of putting into practice the present invention.

Figure 2:
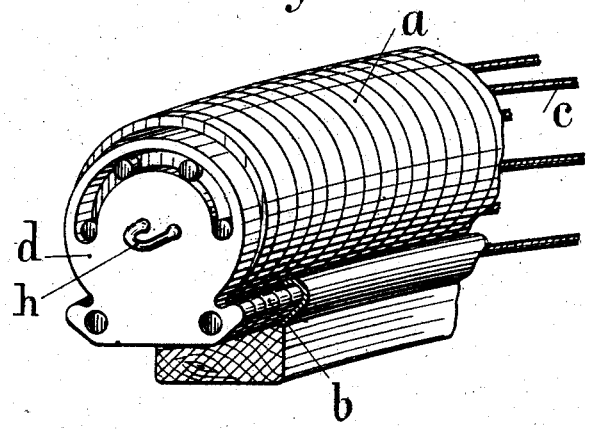

Figure 1 of the drawing represents the tire partly in elevation and partly in section, and mounted on the wheel. Fig. 2 represents in perspective one of its ends.

The tires comprise a series of small pieces $a$ cut out of leather in such a manner as to have on the flat the form indicated in Fig. 2, and, edgewise, the form seen in Fig. 1, that is to say a form somewhat tapered from the top to the bottom. The said pieces carry also, besides their body part $a$, lugs $b$ and a series of holes which give passage to bands of any convenient form $c$. The tire is advantageously put together by uniting the different pieces one to another after having threaded them on the bands, and in finally fastening the whole by means of two end metallic plates $d$, of a similar form to the pieces $a$, but preferably smaller, and with which the ends of the bands are engaged in any manner. The number of pieces of leather employed is, moreover, chosen so that, the tire once made, the circle which it forms on the rim of the wheel may be incomplete, the space left free being filled up by a sort of plug, formed of a certain number of pieces of leather $e$ resembling those in the tire, but without the lugs $b$, by terminal plates $f$, and by an anchor $g$, of which the ends catch in ears $h$ carried on the plates $d$, and the stock of which, screwed at its extremity, goes through the rim and receives a nut $i$. This plug is, in the example shown, formed by two of the said pieces of leather $e$, hollowed or provided with a vertical longitudinal channel, common to each of them through which passes the stock of the anchor and also, as well as the plates $f$ which limit the plug, provided with transverse holes for the passage of the branches of the anchor, which thus keeps the pieces of the plug together.

The mounting of the tire on the rim is easily to be understood. One end of the tire is at first introduced into the rim, being bent slightly or with the component parts obliquely disposed in the rim, and the end of the tire is then pushed forward, being still held obliquely so as to diminish the width of the part which it is desired to get into the rim, until the tire is all mounted on the rim. This done, the tire is arranged so that the division in the circle formed by the tire is to be found on the right of the hole reserved for the passage of the stock of the anchor; the plug is introduced into this division, and then forced down in such a manner that the stock of the anchor $g$ comes out of the rim and the nut $i$ is then put on the screwed part and fastened. The hooks of the anchor then grip the ears $h$ and keep the whole in place. Thus mounted, the tire will be already securely held; it is however better to fix it still more solidly to the rim. To this effect it is furnished at various places with bolts having their heads formed in the shape of a gendarme's hat $j$, which are mounted in the body of the tire in a similar manner to that described for the anchor *g*, and of which the shank parts which come through the rim are fitted with nuts *k*.

To facilitate the putting in place of the tire on the rim, a narrow opening may be formed at a convenient point on the latter to enable the tire to slide into place without having to incline it as has been mentioned. Further, to augment the non-slipping qualities of the tire and its resistance to outside influences, it can be passed, when finished, in whole or in part, through a bath of tar liquid; to protect the parts which would be affected by friction, broken flint pressed into the leather is used; or small nails may be placed in the leather.

It will be understood that the method of carrying out the invention described and shown is only to be considered as an example. It can be carried out in a very different manner. There is no need that the rim should possess incurved edges, nor the tires lugs. One would only have to employ in each case, the method of fixing which was found the best.

Having now particularly described my invention, I declare that what I claim is:

1. A vehicle wheel tire consisting essentially of pieces of leather disposed edgewise and secured together, separate end plates secured to the respective ends of said tire and separated by a space, a securing plug filling said space, and a device mechanically connecting said plug to said end plates and also adapted to secure the plug to the wheel rim.

2. A vehicle wheel tire composed of leather disposed edgewise, end plates of metal, securing bands passing through said end plates and pieces, ears on said plates, and an anchor engaging said ears and secured to the rim of the wheel.

3. A vehicle wheel tire composed of pieces of leather disposed edgewise, end plates of metal, securing bands passing through said pieces and plates, ears on said plates, an anchor having hooks engaging with said ears, and a plug composed of pieces engaged by said anchor and filling the space between the adjacent end plates of the tire.

In testimony whereof I affix my signature in presence of two witnesses.

CLÉMENT CLODOMIR GOUIN.

Witnesses:
HENRY DANFER,
LUCIEN CRESPIN.